United States Patent [19]

Yokoyama

[11] Patent Number: 5,515,256
[45] Date of Patent: May 7, 1996

[54] SELF EXCITING TYPE SWITCHING POWER SUPPLY CIRCUIT

[75] Inventor: Kenji Yokoyama, Hamamatsu, Japan

[73] Assignee: Yamaha Corporation, Japan

[21] Appl. No.: 297,627

[22] Filed: Aug. 29, 1994

[30] Foreign Application Priority Data

Sep. 1, 1993 [JP] Japan .................. 5-052278 U

[51] Int. Cl.[6] ...................................... G05F 1/46
[52] U.S. Cl. ............................. 363/18; 363/21
[58] Field of Search .................. 363/20–21, 56, 363/97, 131, 18; 361/18; 323/266, 267, 271–272

[56] References Cited

U.S. PATENT DOCUMENTS

| | | | |
|---|---|---|---|
| 4,347,559 | 8/1982 | Sturgeon | 363/21 |
| 4,538,101 | 8/1985 | Shimpo et al. | 323/272 |
| 4,984,145 | 1/1991 | Dangschat et al. | 363/19 |
| 5,003,451 | 3/1991 | Gradl et al. | 363/56 |

*Primary Examiner*—Peter S. Wong
*Assistant Examiner*—Aditya Krishnan
*Attorney, Agent, or Firm*—Graham & James

[57] ABSTRACT

In a switching power supply circuit in which a primary winding of a transformer is connected to a DC voltage source through a switching transistor which is turned on and off at a predetermined frequency by voltage of auxiliary windings of the transformer, an integrating circuit is provided between the auxiliary winding of the transformer and the base of the switching transistor for making the waveform of base driving current for the switching transistor similar to the waveform of collector current in a steady state. In parallel with this integrating circuit, a differentiating circuit is provided between the auxiliary winding N3 of the transformer and the base of the switching transistor for operating only at the start of the switching power supply circuit to supply base driving current of a large magnitude to the switching transistor.

1 Claim, 2 Drawing Sheets

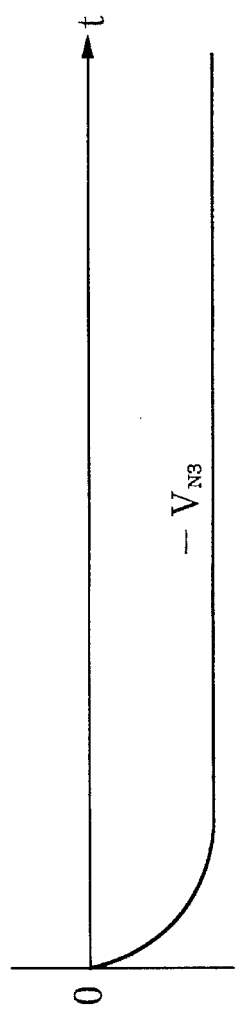
FIG. 2A  POTENTIAL AT P1
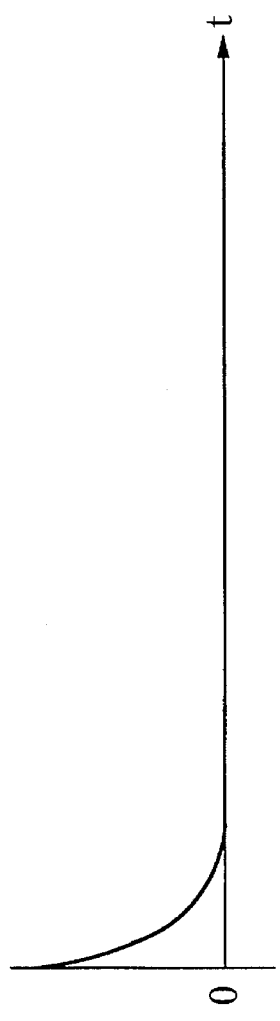
FIG. 2B  POTENTIAL AT P2
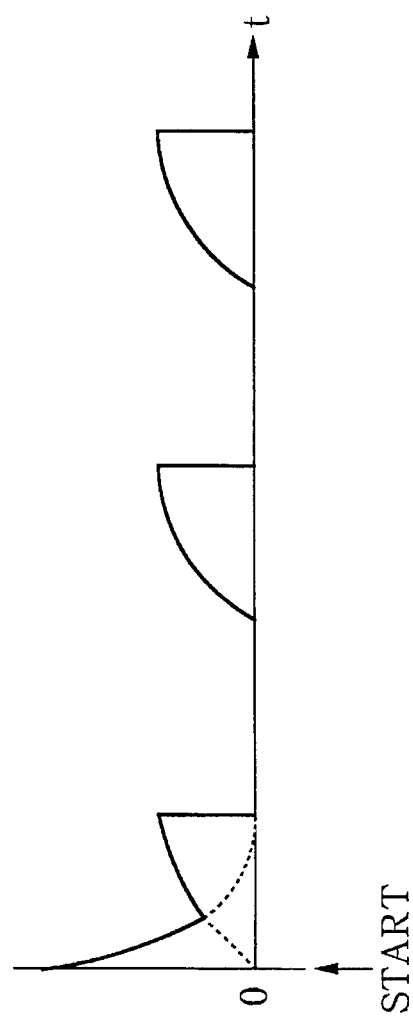
FIG. 2C  POTENTIAL AT P3

SELF EXCITING TYPE SWITCHING POWER SUPPLY CIRCUIT

BACKGROUND OF THE INVENTION

This invention relates to a switching inverter type power supply circuit (hereinafter referred simply to as switching power supply circuit) and, more particularly, to improvement of efficiency in a switching power supply circuit.

In a self-exciting type switching power supply circuit, a primary winding of a transformer is connected to a DC voltage source through a switching transistor and this switching transistor is turned on and off at a predetermined frequency by voltage of an auxiliary winding of the transformer. Since a collector current flowing through the switching transistor in this type of switching power supply circuit is a charging current of the windings of the transformer, this collector current assumes a ramp waveform (sawtooth waveform). On the other hand, for driving the base of the switching transistor, a rectangular waveform voltage produced in the auxiliary windings of the transformer is utilized. When this rectangular waveform voltage is supplied to the base of the switching transistor through, e.g., a current-restricting resistor, the base driving current becomes also a rectangular waveform.

Since a value of the saturation collector current varies depending upon the magnitude of load, it is necessary to set the value of the base driving current so that the switching transistor will be saturated sufficiently even when the saturation value of the base driving current is at the maximum.

When the base driving current for the switching transistor is of a rectangular waveform and the value of the base driving current is set at a large value on the basis of a maximum load state, the base current of a large magnitude flows even at a small load resulting in waste of electric power. Particularly, a high pressure-resisting and high-speed bipolar transistor used for this type of switching power supply has a small current amplification ratio on the order of one figure. For this reason, base current of a value which is not negligible is required in relation to the collector current resulting in loss of electric power due to the base current.

It is, therefore, an object of the invention to provide a switching power supply circuit with improved efficiency which is capable of starting accurately with a reduced power consumption in as ready state.

SUMMARY OF THE INVENTION

For achieving the invention, a switching power supply circuit includes a DC voltage source, a transformer having a primary winding, a secondary winding and a couple of auxiliary windings, one terminal of said primary winding being connected to one terminal of said DC voltage source, a switching transistor through which another terminal of said primary winding is connected to another terminal of said DC voltage source and which is turned on and off at a predetermined frequency, switching means for turning on and off a closed circuit comprising said DC voltage source, said primary winding and said switching transistor, an integrating circuit provided between one of said auxiliary windings of said transformer and the base of said switching transistor for supplying a current to the base of said switching transistor, a waveform of the current being similar to a waveform of collector current, during a period in which said switching means is turned on, and a differentiating circuit provided between the other of said auxiliary windings of said transformer and the base of said switching transistor in parallel with said integrating circuit for operating only immediately after said switching means is turned on to supply a current of a predetermined magnitude to the base of said switching transistor.

According to the invention, the waveform of the base driving current for the switching transistor becomes similar to the waveform of the collector current owing to the provision of the integrating circuit and, therefore, waste of power consumption in a steady state of the switching power supply can be prevented.

In one aspect of the invention, the switching power supply circuit as defined comprises, in addition to the above structure, a differentiating circuit provided between said auxiliary windings of said transformer and the base of said switching transistor in parallel with said integrating circuit for operating only at the start of the power supply circuit to supply a base driving current of a predetermined magnitude to said switching transistor.

When the base driving current has always a ramp waveform, difficulty tends to arise in oscillation at the start of the power supply circuit. According to this aspect of the invention, the differentiating circuit operating only at the start of the power supply circuit is provided which supplies a base driving current of a large magnitude to the switching transistor at the start of the power supply circuit. Accordingly, accurate starting of the circuit is ensured.

Preferred embodiments of the invention will be described below with reference to the accompanying drawings.

BRIEF DESCRIPTION OF THE DRAWINGS

In the accompanying drawings,

FIGS. 2A to 2C are waveform diagrams showing the operation of the switching power supply circuit.

DESCRIPTION OF PREFERRED EMBODIMENTS

Figure 1:
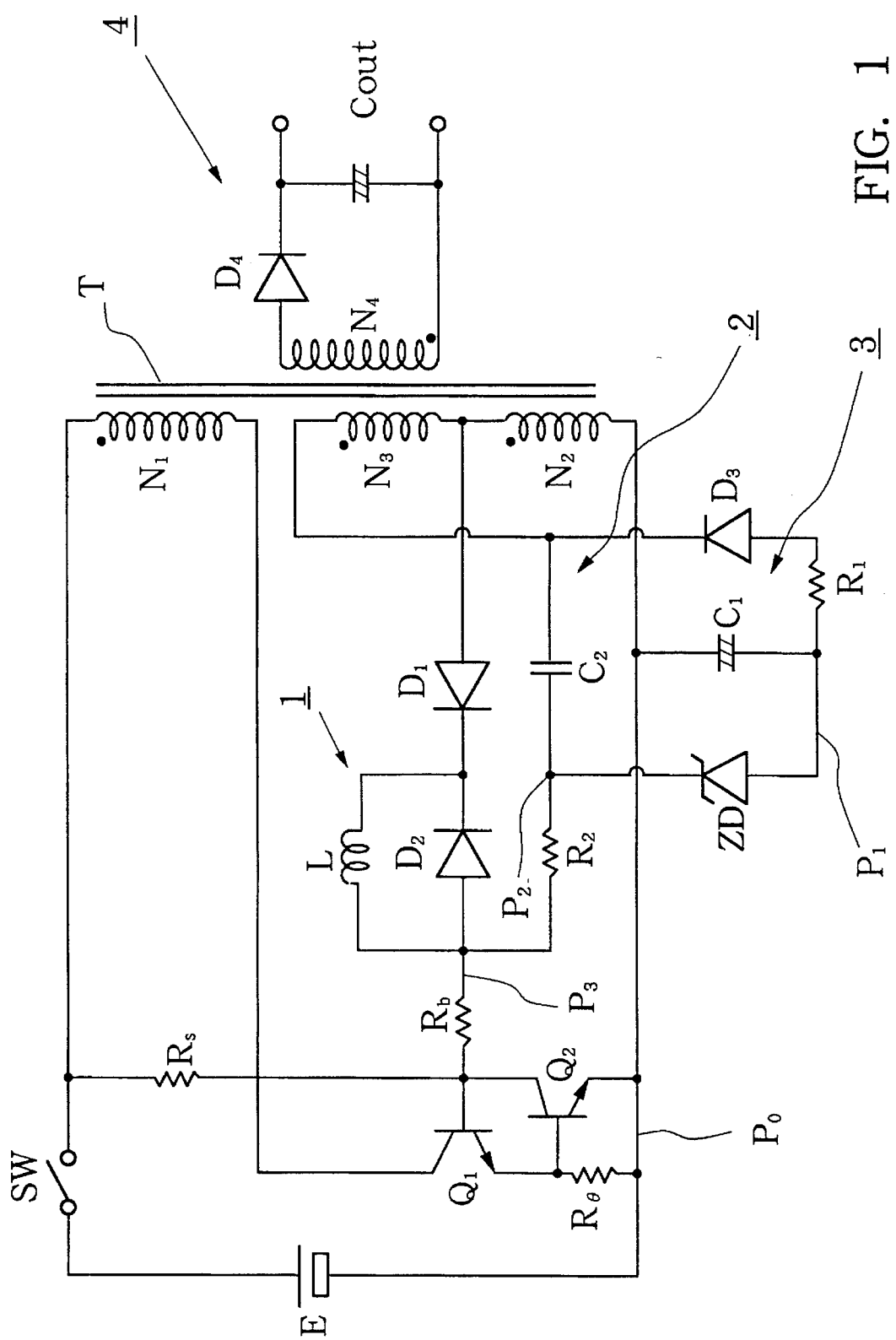
FIG. 1 is a circuit diagram showing an embodiment of the invention.

Referring to FIG. 1 which shows an embodiment of the switching power supply circuit according to the invention, one terminal of a primary winding N1 of a transformer T is connected through a power switch SW to a positive terminal of a DC voltage source E (e.g., 150 V) and another terminal of the primary winding N1 is connected through an npn transistor Q1 as a switching transistor and a resistor Re to a negative terminal (i.e., OV) of the voltage source E. A starting resistor Rs (e.g., 1 mega-ohms) for initially driving the transistor Q1 when the power switch SW has been turned on is provided between the output (the primary winding N1) side terminal of the power switch SW and the base of the transistor Q1. An npn transistor Q2 whose collector and base are respectively connected to the base and emitter of the transistor Q1 and whose emitter is connected to the negative terminal of the voltage source E is an auxiliary transistor which is turned on and off complimentarily with the transistor Q1.

Two auxiliary windings N2 and N3 of the transistor T are drive sources for turning on and off the transistor Q1. Two systems of control drive circuits, i.e., an integrating circuit 1 and a differentiating circuit 2, are formed between these auxiliary windings N2 and N3 and base current restricting resistance Rb (e.g., 10 ohms).

The integrating circuit 1 integrates voltage between terminals of the auxiliary winding N2 and supplies an integrated voltage value to the base of the transistor Q1. In this circuit, an inductance element L is used as an integrating element. The terminal of the auxiliary winding N2, which is connected to the auxiliary winding N3, is connected to a terminal P3 of the currrent-restricting resistor Rb through a rectifying diode D1 and the inductance element L. In parallel with the inductance element L, a diode D2 is connected in the opposite direction to the diode D1.

The differentiating circuit 2 differentiates voltage between both terminals of the auxiliary winding N3 and supplies a differentiated value to the base of the transistor Q1. This circuit is constructed of a capacitor C2 (e.g., 1000 pF) and a resistor R2 (e.g.. 220 ohms).

Across the capacitor C2 which is one element of the differentiating circuit 2 is provided a control circuit 3 which operates the differentiating circuit 2 only at the start of the switching power supply circuit and stops the function of the differentiating circuit 2 in a steady state. The control circuit 3 controls potential at a terminal P2 (connecting the capacitor C2 which is the output terminal of the differentiating circuit 2 with the resistor R2) to become equal to potential at a reference potential PO in a steady state and, for this purpose, is constructed of a charging circuit including a diode D3, a resistor R1 (e.g., 100 ohms) and capacitor C1 which rectify voltage of the auxiliary winding N3 and charge the rectified voltage, and a Zenor diode ZD connected between a terminal P1 of the capacitor C1 (1 micro-farad) and the output terminal P2 of the differentiating circuit 2. The Zenor voltage of the Zenor diode ZD is set to a value (e.g., 10 V) which is equal to a full charging voltage (e.g., −10 V) of the charging capacitor C1, i.e., DC voltage determined by the number of windings of the auxiliary winding N3.

On the secondary side of the transformer T is provided a rectifying and smoothing circuit 4 including a rectifying diode D4 and a smoothing capacitor Cout.

The operation of the switching power supply circuit having the above described structure will now be described with reference to FIGS. 2A, 2B and 2C which show waveforms of potential at some points of the circuit.

Upon turning on of the power switch SW, bias current is supplied to the base of the transistor Q1 through the start resistor Rs. The transistor Q1 is thereby turned on to cause current to flow through the primary winding N1 of the transformer T, transistor Q1 and resistor Re for storage of magnetic energy therein. At this time, the bias current supplied from the start resistor Rs is blocked by the diode D1 and therefore does not flow to the auxiliary winding N2. There is provided the branch circuit consisting of the resistor R2 and the capacitor C2 on the side of the auxiliary winding N3. By setting the value of resistance of the resistor R2 at several hundred ohms and the value of the capacitor C2 at several thousand pico-farad, the branch current can be held at a neglible value.

When current flows through the primary winding N1, voltages corresponding to the number of windings are produced respectively in the auxiliary windings N2 and N3. For example, the voltage produced in the auxiliary N2 is in the order of 1V to 3V and the voltage produced in the auxiliary winding N3 is in the order of 10V to 15V. The voltage of the auxiliary winding N2 is integrated by the integrating circuit 1 consisting of the diode D1 and the inductance element L and is supplied to the base of the transistor Q1 through the current-restricting resistor Rb. The voltage of the auxiliary winding N3 is differentiated by the differentiating circuit 2 consisting of the capacitor C2 and resistor R2 and is supplied to the base of the transistor Q1 through the current-restricting resistor Rb. Therefore, at the starting time, potential at the terminal P3 of the current-restricting resistor Rb assumes a waveform as shown in FIG. 2C which is made of an integrated potential waveform and a differentiated potential waveform superposed one upon the other. By a large initial value of this differentiated potential waveform, the transistor Q1 is started accurately.

The voltage of the auxiliary winding N3 is charged in the capacitor C1 through the diode D3 and resistor R1. As shown in FIG. 2A, the charging voltage rises gradually by the resistor R1 and charging voltage is finally DC voltage VN3 which is determined by the ratio of winding of the auxiliary winding N3. The Zenor voltage of the Zenor diode ZD is set, as described before, to a value which is equal to the value of the full charging voltage of the capacitor C1. After completion of charging, therefore, the potential at the output terminal P2 (shown in FIG. 2B) of the differentiating circuit 2 is equal to the potential at the reference terminal P0, i.e., 0V.

As the collector current of the transistor Q1 rises and the terminal voltage of the resistor Re has reached a certain value, the auxiliary transistor Q2 is turned on and the transistor Q1 thereby is turned off. While the transistor Q1 is ON, the energy stored in the primary winding N1 of the transformer T is discharged to the secondary winding side (N4) and this discharged energy constitutes the output power. Upon completion of discharging of the stored energy, the secondary winding becomes open and an electromotive force thereby is produced. This electromotive force is fed back to turn on the transistor Qi again. Thereafter, the above described operation is repeated and the transistor Q1 is repeatedly turned on and off.

While oscillation is continued, the terminal P2 of the differentiating circuit 2 is maintained at OV and the differentiating circuit 2 therefore does not perform its function. In this state, driving of the base of the transistor Q1 is repeated only by the integrating circuit consisting of the diode D1 and the inductance element L as shown in FIG. 2C.

As described in the foregoing, according to the above described embodiment, the waveform of the base driving current becomes a ramp waveform which is similar to the waveform of the collector current owing to the integrating circuit 1 and waste base current therefore is eliminated with resulting reduction in the power consumption. Further, at the starting, the differentiated potential waveform is superposed on the integrated potential waveform in the base driving waveform for the transistor Q1, so that a large base driving current is obtained and an accurate starting thereby is ensured. As a result, by selecting the number of the auxiliary winding N2 so that the terminal voltage thereof will become a minimum low value, overdriving of the transistor Q1 a steady state is eliminated whereby further reduction in the power consumption can be realized.

Since the bias current supplied from the start resistor Rs is used mostly as the base current of the transistor Q1 without flowing as a branch current, a resistor having a high resistance value of 1M ohms or over can be used as the start resistor Rs. Therefore, power consumption by the bias current can also be reduced.

What is claimed is:

1. A switching power supply circuit comprising:
   a DC voltage source;
   a transformer having a primary winding, a secondary winding and a couple of auxiliary windings, one terminal of said primary winding being connected to one terminal of said DC voltage source;

a switching transistor through which another terminal of said primary winding is connected to another terminal of said DC voltage source and which is turned on and off at a predetermined frequency;

switching means for turning on and off a closed circuit comprising said DC voltage source, said primary winding and said switching transistor;

an integrating circuit provided between one of said auxiliary windings of said transformer and the base of said switching transistor for supplying a current to the base of said switching transistor, a waveform of the current being similar to a waveform of collector current, during a period in which said switching means is turned on; and a differentiating circuit, provided between another one of said auxiliary windings of said transformer and the base of said switching transistor in parallel with said integrating circuit, for operating only immediately after said switching means is turned on to supply a current of a predetermined magnitude to the base of said switching transistor.

* * * * *